US012661611B2

(12) United States Patent
Mbadinga Mouanda et al.

(10) Patent No.: US 12,661,611 B2
(45) Date of Patent: Jun. 23, 2026

(54) SORPTION FILTER DEVICE

(71) Applicant: MANN+HUMMEL GmbH,
Ludwigsburg (DE)

(72) Inventors: Gelase Mbadinga Mouanda,
Sachsenheim (DE); Coskun Evlekli,
Waiblingen (DE); Josef Prochazka,
Velke Mezirici (CZ)

(73) Assignee: MANN+HUMMEL GmbH,
Ludwigsburg (DE)

( * ) Notice: Subject to any disclaimer, the term of this
patent is extended or adjusted under 35
U.S.C. 154(b) by 370 days.

(21) Appl. No.: 18/450,465

(22) Filed: Aug. 16, 2023

(65) Prior Publication Data

US 2024/0091700 A1     Mar. 21, 2024

(30) Foreign Application Priority Data

Sep. 19, 2022     (EP) ..................................... 22196309

(51) Int. Cl.
| | |
|---|---|
| *B01D 53/04* | (2006.01) |
| *B01D 46/121* | (2022.01) |
| *B60H 3/06* | (2006.01) |
| *B01D 53/26* | (2006.01) |

(52) U.S. Cl.
CPC ....... *B01D 53/0446* (2013.01); *B01D 46/121*
(2022.01); *B01D 53/0438* (2013.01); *B60H*
*3/0633* (2013.01); *B01D 53/261* (2013.01);
*B01D 2253/102* (2013.01); *B01D 2257/504*
(2013.01); *B01D 2257/80* (2013.01);
(Continued)

(58) Field of Classification Search
None
See application file for complete search history.

(56) References Cited

U.S. PATENT DOCUMENTS

| | | | |
|---|---|---|---|
| 3,528,224 | A | 9/1970 | Warn |
| 5,129,929 | A | 7/1992 | Linnersten |
| 5,716,521 | A | 2/1998 | Whiteley et al. |

(Continued)

FOREIGN PATENT DOCUMENTS

| | | |
|---|---|---|
| DE | 4039951 A1 | 6/1992 |
| DE | 10039885 A1 | 2/2002 |

(Continued)

OTHER PUBLICATIONS

European Search Report in corresponding EP Appln. No. 22196309.
3, Apr. 20, 2023, European Patent Office—Munich.

*Primary Examiner* — Gabriel E Gitman

(57) ABSTRACT

A sorption filter device includes a sorption filter element
including at least two sorption bodies with at least one
sorbent, the at least two sorption bodies being arranged in a
V-shape and enclosing an intermediate space that is open at
a head side thereof, an outer sealing element running around
an outer circumference of the head side, and an inner sealing
surface arranged at the head side and running around a
circumference delimiting the intermediate space at the head
side. The sorption filter device further includes a housing
including a first housing part configured to receive the
sorption filter element, and a second housing part detachably
connectable to the first housing part and configured to close
the housing in a closed state thereof, the sorption filter
element being received in the first housing part in such a way
that the head side faces the second housing part.

12 Claims, 13 Drawing Sheets

(52) U.S. Cl.
       CPC ............... *B01D 2259/4009* (2013.01); *B01D*
                *2259/4566* (2013.01); *B60H 3/0608* (2013.01)

(56)                    References Cited

U.S. PATENT DOCUMENTS

| | | | |
|---|---|---|---|
| 2004/0134210 A1 | 7/2004 | Yabu et al. | |
| 2009/0142234 A1 | 6/2009 | Tatarchuk et al. | |
| 2012/0063981 A1 | 3/2012 | Yeganeh et al. | |
| 2013/0068102 A1 | 3/2013 | Mori et al. | |
| 2015/0078964 A1 | 3/2015 | Meirav et al. | |
| 2016/0074803 A1* | 3/2016 | Gebald | B01D 53/0415 |
| | | | 95/139 |
| 2016/0109143 A1 | 4/2016 | Kogan et al. | |
| 2016/0228811 A1 | 8/2016 | Meirav et al. | |
| 2017/0056812 A1 | 3/2017 | Meirav et al. | |
| 2018/0073474 A1 | 3/2018 | Clayton, Jr. | |
| 2019/0168154 A1* | 6/2019 | Knight | B01D 46/0005 |
| 2020/0030734 A1 | 1/2020 | Hara et al. | |
| 2020/0289970 A1* | 9/2020 | Holzmann | B01D 46/0002 |

FOREIGN PATENT DOCUMENTS

| | | | |
|---|---|---|---|
| DE | 202006015228 U1 | 8/2007 | |
| ES | 1214314 U | 6/2018 | |
| JP | 2016002519 A | 1/2016 | |
| KR | 20180006197 A | 1/2018 | |
| WO | 9420193 A1 | 9/1994 | |
| WO | 9902242 A1 | 1/1999 | |
| WO | 15024014 A1 | 2/2015 | |
| WO | 20104144 A1 | 5/2020 | |

* cited by examiner

SORPTION FILTER DEVICE

CROSS-REFERENCE TO RELATED APPLICATION

This application claims the benefit of European Application No. 22196309.3 filed on Sep. 19, 2022, the entire disclosure of which is incorporated herein by reference for all purposes.

BACKGROUND

The present invention relates to a sorption filter device.

In the case of vehicles that are at least partially electrically powered, it is advisable to save as much energy as possible in order to achieve the longest possible range. For reasons of comfort, the passenger compartment of such a vehicle can usually be air conditioned with the aid of an air conditioning system. With regard to the desired energy savings, it is advantageous if the air conditioning system for air conditioning the passenger compartment draws in as little fresh air as possible from the vehicle's surroundings and heats or cools it, but instead recirculates and air conditions the air in the passenger compartment.

In the aforementioned recirculation mode for air conditioning the passenger compartment, however, water contained in the exhaled air of occupants or passengers can accumulate in the passenger compartment, which can lead to fogging of windows, for example a windshield or side windows, of the motor vehicle. The reason for this is that the dehumidifying effect of an air conditioning system, which results from a dew point undershoot in the evaporator heat exchanger, cannot be used in recirculation mode. This must be avoided or at least reduced with regard to safety aspects.

Furthermore, carbon dioxide contained in the exhaled air can also accumulate in the passenger compartment. This can lead to concentration problems or even health problems for the occupants. This, too, must be prevented or at least reduced with regard to both safety and health aspects, since in the worst-case scenario, an excessively high concentration of carbon dioxide in the passenger compartment air can reduce the driver's ability to concentrate to such an extent that accidents are imminent.

SUMMARY

It is therefore an object of the invention to provide an improved sorption filter device for a mechanism for reducing the carbon dioxide and water content in a passenger compartment of a motor vehicle.

Accordingly, a sorption filter device is provided. The sorption filter device includes at least one sorption filter element, wherein the sorption filter element includes at least two sorption bodies with at least one sorbent, wherein the sorption bodies are arranged in a V-shape, wherein the sorption bodies enclose an intermediate space that is open at a head side thereof, wherein the sorption filter element includes an outer sealing element that runs around an outer circumference of the head side, wherein the sorption filter element includes a circumferential inner sealing surface that is arranged at the head side, wherein the inner sealing surface is placed within the inner space, and a housing, wherein the housing includes a first housing part for receiving the sorption filter element and a second housing part, wherein the second housing part is detachably connectable to the first housing part, wherein the second housing part closes the housing in a closed state thereof, wherein the sorption filter element is received in the first housing part in such a way that the head side faces the second housing part, wherein the housing includes at least one first air inlet/outlet and at least one second air inlet/outlet, wherein the sorption filter element is arranged between the first air inlet/outlet and the second air inlet/outlet in a fluidic way, wherein at least one of the first air inlet/outlet and the second air inlet/outlet is provided at the second housing part, wherein the sorption filter device includes an air guidance element that is arranged between the sorption filter element and the second housing part, and wherein the air guidance element protrudes into the intermediate space at the head side in a mounted state of the second housing part.

The sorption filter element is particularly suitable for adsorbing and/or absorbing carbon dioxide and water. However, also substances like nitrogen oxides (NOX) and/or volatile organic compounds (VOCs) can be adsorbed and/or absorbed by the sorption filter element. Examples of volatile organic compounds are higher hydrocarbons. The sorption filter element may also be suitable for adsorbing and/or absorbing sulfur dioxide (SO2).

In the present context, "sorption" refers to processes that lead to an enrichment of a substance, for example carbon dioxide or water, within a phase or on an interface between two phases. Accumulation within a phase is referred to as absorption, while accumulation at the interface is referred to as adsorption. In the present context, "desorption" refers to processes in which atoms or molecules, in particular carbon dioxide or water, leave the surface of a solid. Desorption thus generally represents the reverse process of sorption. By applying heat to the sorbent, the adsorbed and/or absorbed substances can be released from the sorbent.

In a sorption mode, the sorption filter element adsorbs and/or absorbs different substances like carbon dioxide and/or water. In a desorption mode, the enriched substances can be released from the sorption filter element. Thus, the sorption filter element can be regenerated. In the desorption mode, heat is applied to the sorption filter element, in particular to the sorbent. The sorption filter element may be a pure adsorption filter element or may be designated as such. Preferably, the sorption filter element can be easily and quickly replaced. The sorption mode may also be, or be designated as, a pure adsorption mode. The desorption mode may also be referred to as regeneration mode.

The sorption filter element preferably includes several sorbents. In particular, a sorbent suitable to sorb, especially to adsorb, carbon dioxide may be provided. This sorbent may be referred to as carbon dioxide sorbent or CO2 sorbent. Another sorbent may be provided that is suitable to sorb, especially adsorb, water. This sorbent may be referred to as water sorbent or H2O sorbent. The sorbents may be in granular or fibrous form, in particular in bulk form. In particular, the sorbents are fixed by means of a carrier material. The sorbents may also be pure adsorbents or be designated as such. Raw air may be guided through the sorbents in a parallel or serial way.

In the desorption mode, regeneration air can be taken from an enclosed air volume or from an environment. Initially, the regeneration air is unloaded. In the desorption mode, the unloaded regeneration air is loaded with carbon dioxide and water and supplied to the environment as loaded regeneration air. By the fact that the regeneration air is "unloaded" with carbon dioxide and water, it is to be understood in particular that the regeneration air can absorb stored carbon dioxide and water in the sorption filter element being in desorption mode. However, this does not preclude the unloaded regeneration air from also being able to absorb a certain amount of carbon dioxide and water. However, the unloaded regeneration air is not saturated with carbon dioxide and water.

Due to the air guidance element, the guidance of air through the sorption filter element is improved. The combination of the outer sealing element and the circumferential inner sealing surface enables a unique sealing interface. This prevents incorrect installation of the sorption filter element or replacement with a sorption filter element that does not fit the sorption filter device.

In embodiments, the air guidance element includes an outer contour that corresponds to a contour of the intermediate space.

In embodiments, the air guidance element includes air guidance side walls, wherein the air guidance side walls are preferably grid-like.

In embodiments, the air guidance element is part of an air heating and guidance mechanism, wherein the air heating and guidance mechanism includes a sealing element, in particular an axial sealing element, which lies against the inner sealing surface of the sorption filter element in the mounted state of the second housing part.

In embodiments, the housing includes a circumferential outer sealing surface against which the outer sealing element of the sorption filter element in the mounted state of the second housing part.

In embodiments, the outer sealing surface is axially set back relative to the sealing element of the air heating and guidance mechanism.

In embodiments, the air heating and guidance mechanism includes a heating element that is arranged within the second housing part, wherein the heating element is preferably arranged axially beyond the intermediate space.

In embodiments, the housing includes a circumferential outer sealing surface against which the outer sealing element of the sorption filter element lies in the mounted state of the second housing part.

In embodiments, the outer sealing surface of the housing is provided at the first housing part or at the second housing part.

Furthermore, a sorption filter element for a sorption filter device is provided. The sorption filter element includes at least two sorption bodies with at least one sorbent, wherein the sorption bodies are arranged in a V-shape, wherein the sorption bodies enclose an intermediate space that is open at a head side thereof, wherein the sorption filter element includes an outer sealing element that runs around an outer circumference of the head side, wherein the sorption filter element includes a circumferential inner sealing surface that is arranged at the head side, wherein the inner sealing surface is placed within the intermediate space, and wherein the inner sealing surface is axially set back relative to the outer sealing element.

Furthermore, usage of a sorption filter element in a sorption filter device is provided.

Furthermore, usage of a sorption filter device in a system for reducing the CO2-content within a passenger compartment is provided.

BRIEF DESCRIPTION OF DRAWINGS

In the figures, identical or functionally identical elements have been given the same reference signs unless otherwise indicated.

DETAILED DESCRIPTION

Figure 1:
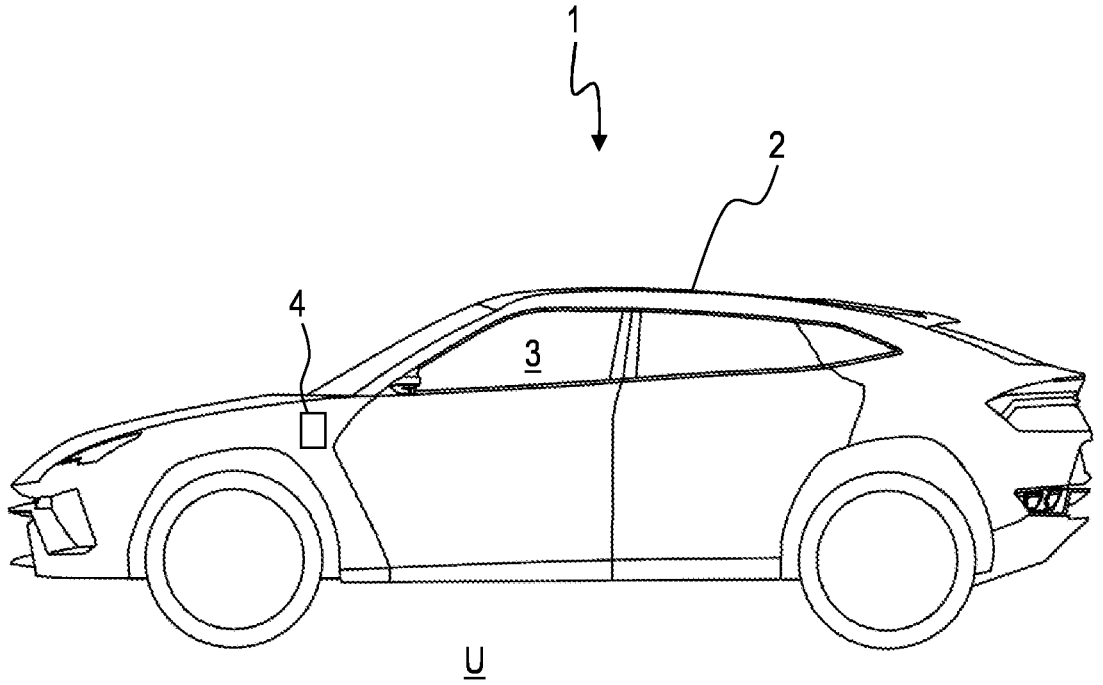
FIG. 1 is a schematic view of one embodiment of a motor vehicle.

FIG. 1 shows a schematic view of an embodiment of a motor vehicle 1. The motor vehicle 1 is preferably an electric vehicle or a hybrid vehicle. However, the motor vehicle 1 may also be driven by means of an internal combustion engine. The motor vehicle 1 includes a body 2 which encloses an enclosed air volume 3. "Enclosed" in this context means that the body 2 defines boundaries or a geometric extension of the enclosed air volume 3. However, this does not necessarily mean that the enclosed air volume 3 cannot be in air exchange with an environment U of the motor vehicle 1.

The enclosed air volume 3 is an interior or passenger compartment of the motor vehicle 1. However, the enclosed air volume 3 may also be associated with a watercraft, a construction machine or a construction vehicle, a rail vehicle, an agricultural machine or an agricultural vehicle, or an aircraft. However, the enclosed air volume 3 may also be part of a building or a stationary machine.

In the following, however, it is assumed that the enclosed air volume 3 is the passenger compartment of the motor vehicle 1. Therefore, the enclosed air volume 3 is hereinafter referred to as the passenger compartment. The passenger compartment 3 can be air conditioned by means of a heating, ventilation, and air conditioning (HVAC) system 4. To extend a range of such an electrically driven motor vehicle 1, it is desirable to save as much energy as possible. With reference to the HVAC system 4, this means that it should draw in as little fresh air as possible from the environment U of the motor vehicle 1 to air condition the passenger compartment 3.

However, when recirculated air taken in the passenger compartment 3 is used to air condition the passenger compartment 3, water (H2O) contained in the exhaled air of occupants or passengers may accumulate in the passenger compartment 3, which may cause windows, for example a windshield or side windows, of the motor vehicle 1 to fog. This must be avoided or at least reduced with regard to safety aspects. Furthermore, carbon dioxide (CO2) contained in the exhaled air can also accumulate in the passenger compartment 3. This can lead to concentration problems or even health impairments for the occupants. This, too, must be prevented or at least reduced with regard to both safety and health aspects.

Figure 2:
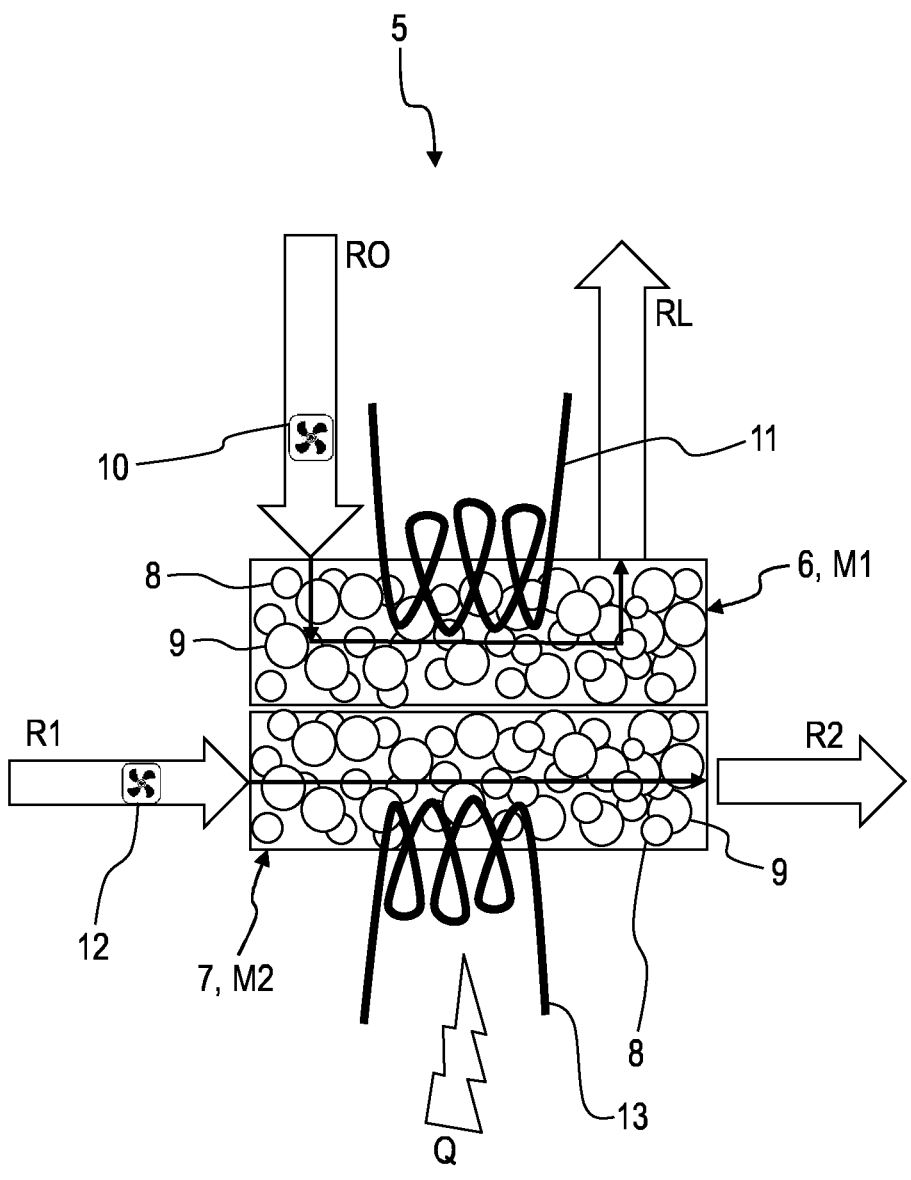
FIG. 2 is a schematic view of one embodiment of a mechanism for the motor vehicle according to FIG. 1.

FIG. 2 shows a schematic view of an embodiment of a mechanism 5 for the combined reduction of CO2 and H2O, in particular water vapor, within the passenger compartment 3. With the aid of the mechanism 5, the previously mentioned disadvantages can be prevented or their effect at least reduced. In addition, the mechanism 5 can also be used to prevent impurities from the environment U from entering the passenger compartment 3, since the preparation of the circulating air means that the intake of ambient air can be largely dispensed with.

The mechanism 5 includes a first sorption filter device 6 and a second sorption filter device 7. "Sorption" is a collective term for processes that lead to an accumulation of a substance within a phase or at an interface between two phases. The enrichment within a phase is more precisely called absorption, and that at the interface adsorption. This means that the sorption filter devices 6, 7 are suitable for adsorbing and/or absorbing substances such as CO2 and H2O, but also nitrogen oxides (NOX) and/or volatile organic compounds (VOCs). Examples of volatile organic compounds are higher hydrocarbons. The sorption filter devices 6, 7 may also be suitable for adsorbing and/or absorbing sulfur dioxide (SO2). Preferably, however, the sorption filter devices 6, 7 are pure adsorbing units or may be designated as such.

The sorption filter devices 6, 7 are preferably interchangeable and, as will be explained further below, can be operated alternately in a sorption mode M1 and in a desorption mode M2. The sorption filter devices 6, 7 are cartridge-shaped and may be referred to as cartridges or sorption filter elements. The sorption mode M1 may also be referred to as the adsorption mode. The desorption mode M2 may also be referred to as regeneration mode. That is, the first sorption filter device 6 is in the sorption mode M1 when the second sorption filter device 7 is in the desorption mode M2 and vice versa. Thus, both sorption filter devices 6, 7 are never in the same mode M1, M2 at the same time. Preferably, the sorption filter devices 6, 7 each have a cartridge shape so that they can be easily exchanged.

Each sorption filter device 6, 7 includes a first sorbent 8 and a second sorbent 9. Preferably, the sorbents 8, 9 are adsorbents or can be designated as such. For example, the first sorbent 8 is suitable for adsorbing CO2. Accordingly, the second sorbent 9 may be suitable to adsorb H2O. The two sorbents 8, 9 may thus remove H2O and CO2 from the passenger compartment 3. The first sorbent 8 is illustrated with small circles. The second sorbent 9 is illustrated with large circles. Other sorbents may also be provided, suitable for sorbing NOX or VOCs, for example. Thus, any number of different sorbents 8, 9 can be provided for processing the circulating air in the passenger compartment 3.

For example, in addition to the sorbents 8, 9, at least one further sorbent or also several further sorbents (not shown) are provided which are suitable for removing fine particles, NOx and/or VOCs from raw air RO. The further sorbents may be introduced between two carrier layers, in particular carrier layers made of a nonwoven fabric. Alternatively, the sorbents 8, 9 and the further sorbents may be mixed together. The further sorbents may include activated carbon which, in particular in the form of a bulk, is preferably introduced between the two carrier layers. The further sorbent or sorbents may be mixed with the first sorbent 8 and/or with the second sorbent 9 to build up one or more mixed bulk layers.

Furthermore, the sorption filter devices 6, 7 can also be suitable for removing allergens, bacteria and/or viruses from the raw air RO in addition to CO2 and H2O. This can be done by a functional coating of carrier materials, for example nonwovens, or by a functional coating of the sorbents 8, 9. Furthermore, the sorption filter devices 6, 7 can have at least one fragrance component from a comfort aspect.

The sorbents 8, 9 can each be in the form of spherical granules. Preferably, the sorbents 8, 9 are fixed to a carrier material or are fixed with the aid of a carrier material. The sorption filter devices 6, 7 can each have a cylindrical, in particular a hollow-cylindrical, a pie-shaped or a rectangular geometry. By a "pie-shaped" geometry is meant in particular a flat circular-cylindrical geometry.

In FIG. 2, the first sorption filter device 6 is in the previously mentioned sorption mode M1. The second sorption filter device 7 is in the desorption mode M2. In the sorption mode M1, raw air RO loaded with CO2 and H2O from the passenger compartment 3 is fed to the first sorption filter device 6. A first blower 10 may be provided for this purpose. The raw air RO is passed through the first sorption filter device 6 at least in sections, with the sorbents 8, 9 purifying the raw air RO of CO2 and H2O. The purified raw air RO is fed back to the passenger compartment 3 as clean air RL.

An optional first heating element 11 is assigned to the first sorption filter device 6, with the aid of which heat Q can be supplied to the sorbents 8, 9. In the sorption mode M1, the first heating element 11 is inactive, so that it does not supply heat Q to the first sorption filter device 6. The first heating element 11 can be a heating wire passed through the first sorption filter device 6, which is energized to introduce heat Q and thus heats the sorbents 8, 9. However, heat Q may also be introduced by any other means. For example, heat Q may be waste heat from an electric motor used to drive the motor vehicle 1. Heat Q may also be waste heat from a conventional internal combustion engine, a battery cooling system, or a fuel cell cooling circuit. The first heating element 11 may also be a heat exchanger or include a heat exchanger.

In the desorption mode M2, unloaded regeneration air R1 is supplied to the second sorption filter device 7 being loaded with CO2 and H2O. A second blower 12 can be used for this purpose. By the fact that the unloaded regeneration air R1 is "unloaded" with CO2 and H2O, it is to be understood that the unloaded regeneration air R1 can absorb CO2 and H2O stored in the second sorption filter device 7. That is, the unloaded regeneration air R1 may also have some content of CO2 and H2O. However, the unloaded regeneration air R1 is not saturated with CO2 and H2O. The unloaded regeneration air R1 can be taken from the passenger compartment 3 or the environment U, for example.

Furthermore, an optional second heating element 13 is provided, by means of which the second sorption filter device 7 is heated in the desorption mode M2 and thus heat Q is introduced into the second sorption filter device 7. The first heating element 11 and the second heating element 13 are preferably of identical construction and are operated alternately. As previously mentioned, heat Q may also be supplied, for example, in the form of waste heat from an electric motor. However, as also mentioned previously, heat Q may also be waste heat from a conventional internal combustion engine, a battery cooling system or a fuel cell cooling circuit. The second heating element 13 may also be a heat exchanger or include a heat exchanger.

When the sorbents 8, 9 are heated in the desorption mode M2 of the second sorption filter device 7, they release $CO_2$ and $H_2O$ to the unloaded regeneration air R1. In other words, $CO_2$ and $H_2O$ are desorbed. A temperature above 55° C. is preferably required for desorption. The unloaded regeneration air R1 is passed through the second sorption filter device 7, absorbs $CO_2$ and $H_2O$ there and is discharged from the second sorption filter device 7 as loaded regeneration air R2. In particular, the loaded regeneration air R2 is supplied to the environment U.

Figure 3:
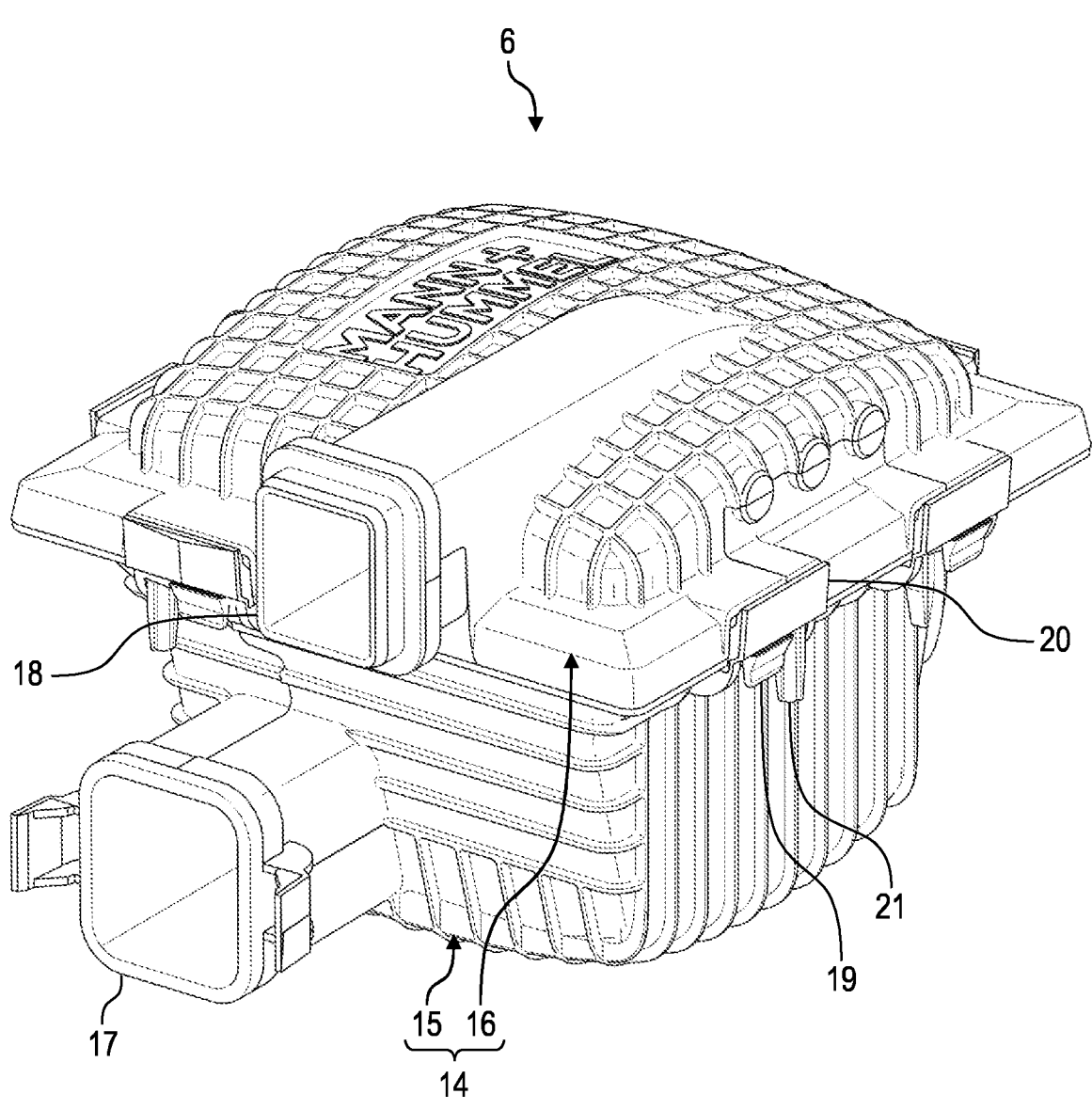
FIG. 3 is a schematic perspective view of one embodiment of a sorption filter device for the mechanism according to FIG. 2.
Figure 4:
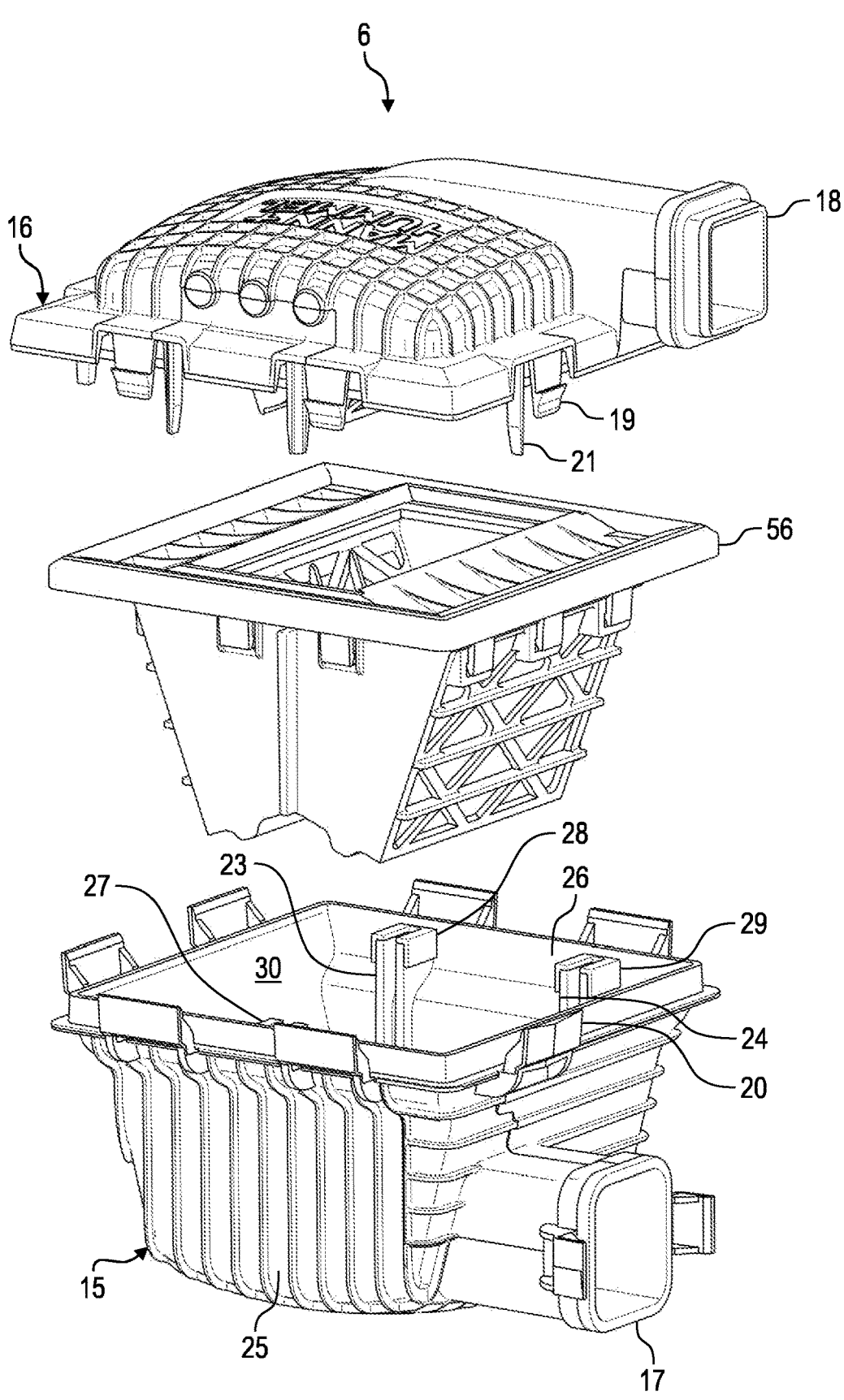
FIG. 4 is a schematic exploded perspective view of the sorption filter device according to FIG. 3.
Figure 5:
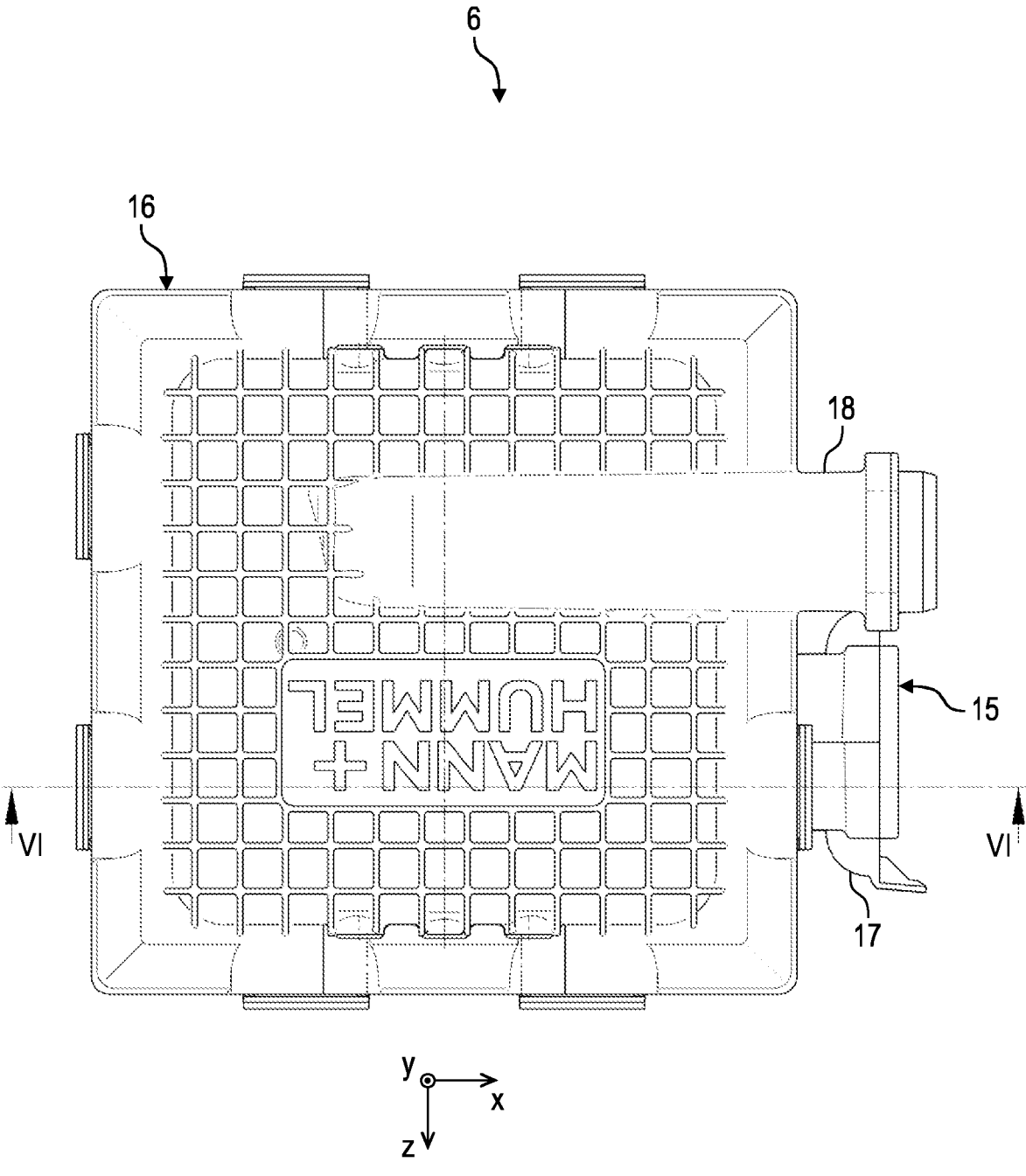
FIG. 5 is a schematic top view of the sorption filter device according to FIG. 3.
Figure 6:
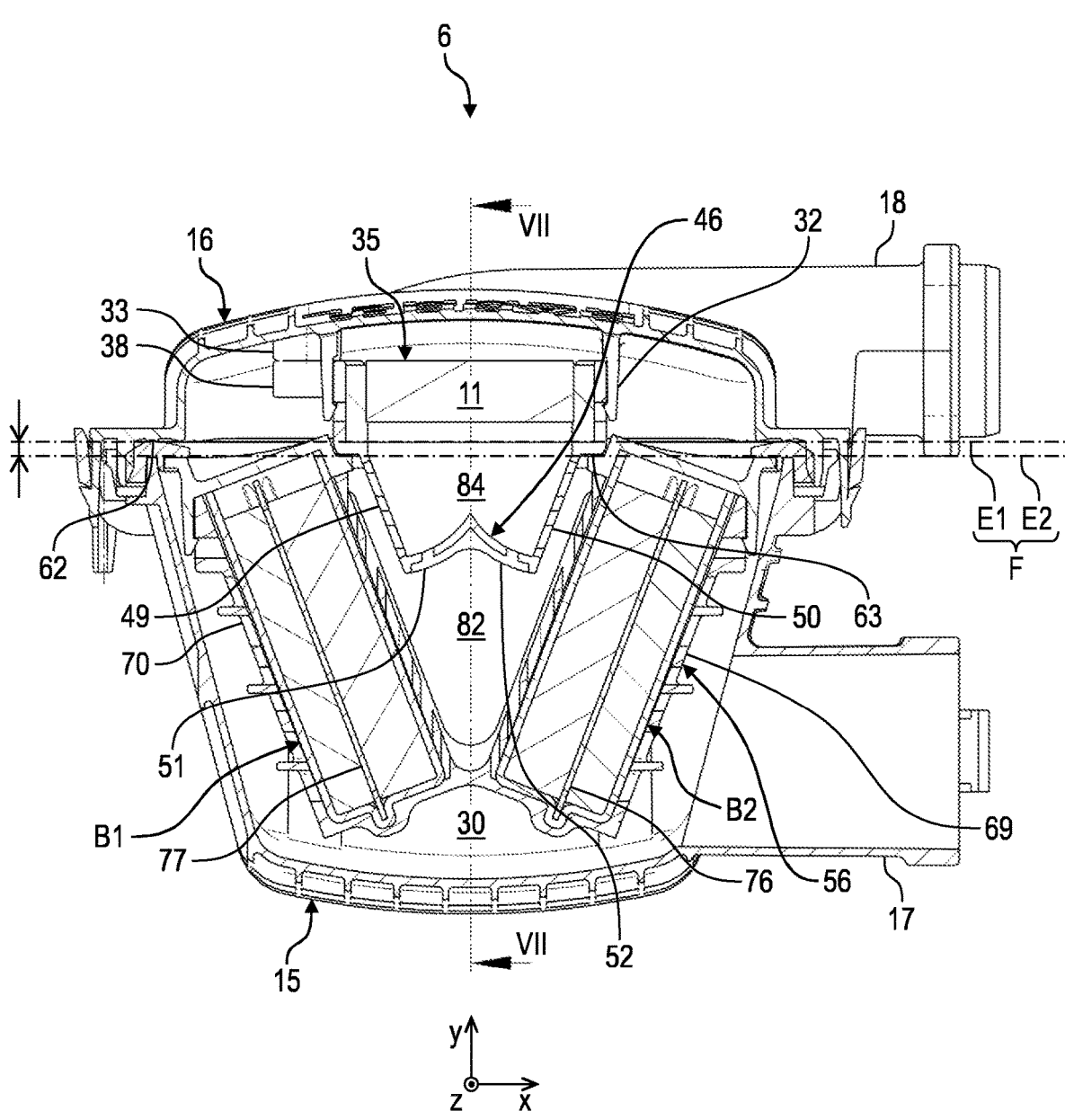
FIG. 6 is a schematic cross-sectional view of the sorption filter device according to the intersection line VI-VI of FIG. 5.
Figure 7:
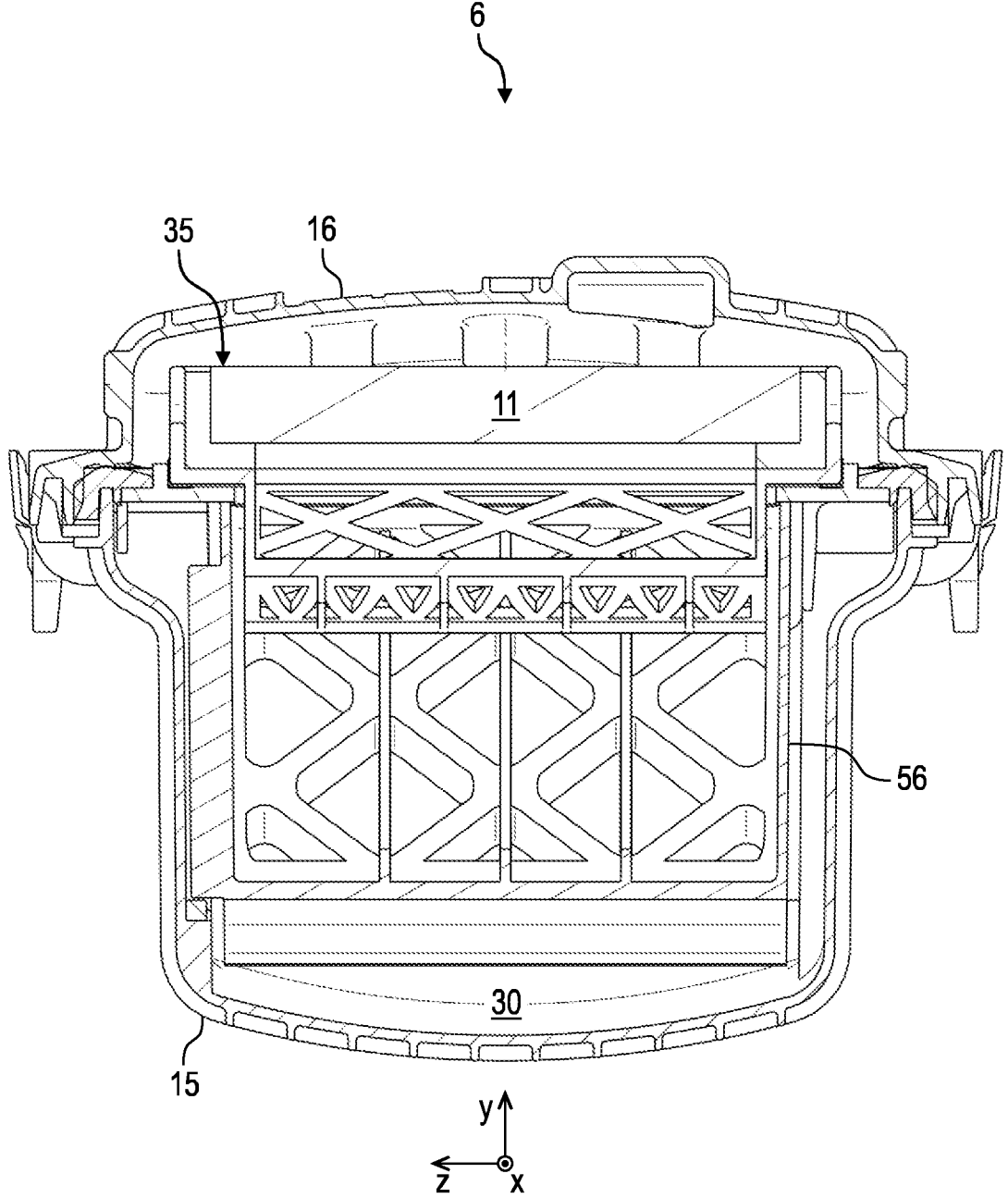
FIG. 7 is a further schematic cross-sectional view of the sorption filter device according to the intersection line VII-VII of FIG. 6.
Figure 8:
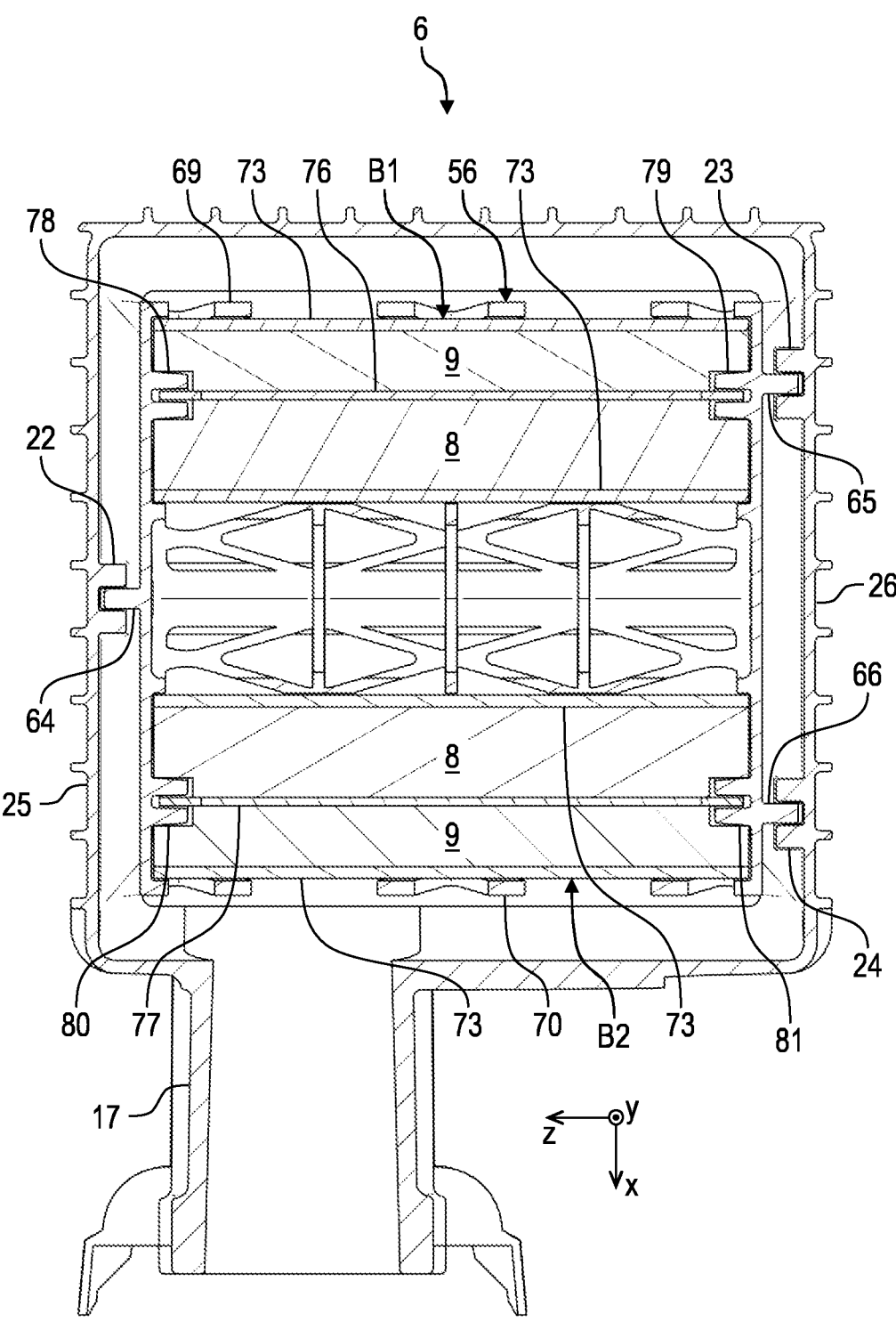
FIG. 8 is a further schematic cross-sectional view of the sorption filter device according to FIG. 3.

FIG. 3 shows a perspective view of one embodiment of the first sorption filter device 6. FIG. 4 shows a perspective exploded view of the first sorption filter device 6. FIG. 5 shows a top view of the first sorption filter device 6. FIG. 6 shows a cross-sectional view of the first sorption filter device 6 along the intersection line VI-VI of FIG. 5. FIG. 7 shows a further cross-sectional view of the first sorption filter device 6 along the intersection line VII-VII of FIG. 6. FIG. 8 shows a further cross-sectional view of the first sorption filter device 6. In the following, FIGS. 3 to 8 will be referred to at the same time.

The sorption filter devices 6, 7 are designed identical. In the following, only the first sorption filter device 6 will be referred to. However, all explanations concerning the first sorption filter device 6 can be applied to the second sorption filter device 7 and vice versa.

The first sorption filter device 6 includes a coordinate system with a width direction or x-direction x, a height direction or y-direction y and a depth direction or z-direction z. The directions x, y, z are arranged perpendicular to each other.

The first sorption filter device 6 includes a housing 14 with a first housing part 15 and a second housing part 16. The second housing part 16 is attached to the first housing part 15. The second housing part 16 can be removed from the first housing part 15. The first housing part 15 and the second housing part 16 can be plastic parts, in particular injection molded plastic parts. The housing 14 has a first air inlet/outlet 17 and a second air inlet/outlet 18. The first air inlet/outlet 17 is provided at the first housing part 15. The second air inlet/outlet 18 is provided at the second housing part 16. The clean air RL, the raw air RO, and the regeneration air R1, R2 can be guided through the air inlets/outlets 17, 18 as will be explained later.

The second housing part 16 includes a plurality of snap hooks 19 of which only one is provided with a reference sign. The first housing part 15 includes a plurality of corresponding receiving sections 20 of which only one is provided with a reference sign. To connect the second housing part 16 to the first housing part 15, the snap hooks 19 engage with the receiving sections 20. The second housing part 16 further has a plurality of guidance elements 21 of which only one is provided with a reference sign. The guidance elements 21 also engage with the receiving sections 20.

Within the first housing part 15 there are provided guidance tracks 22 to 24 (FIG. 8). The number of guidance tracks 22 to 24 is arbitrary. Preferably, there are provided three guidance tracks 22 to 24. The guidance track 22 and the guidance tracks 23, 24 are provided on opposing walls 25, 26 of the first housing part 15. Each guidance track 22 to 24 has a damping element 27 to 29. The damping elements 27 to 29 are made of a flexible material. For example, the damping elements 27 to 29 are made of polyurethane or the like. The housing 14 encloses an interior 30. The guidance tracks 22 to 24 are arranged within this interior 30.

Figure 9:
FIG. 9 is a schematic perspective view of one embodiment of a second housing part for the sorption filter device according to FIG. 3.
Figure 9:
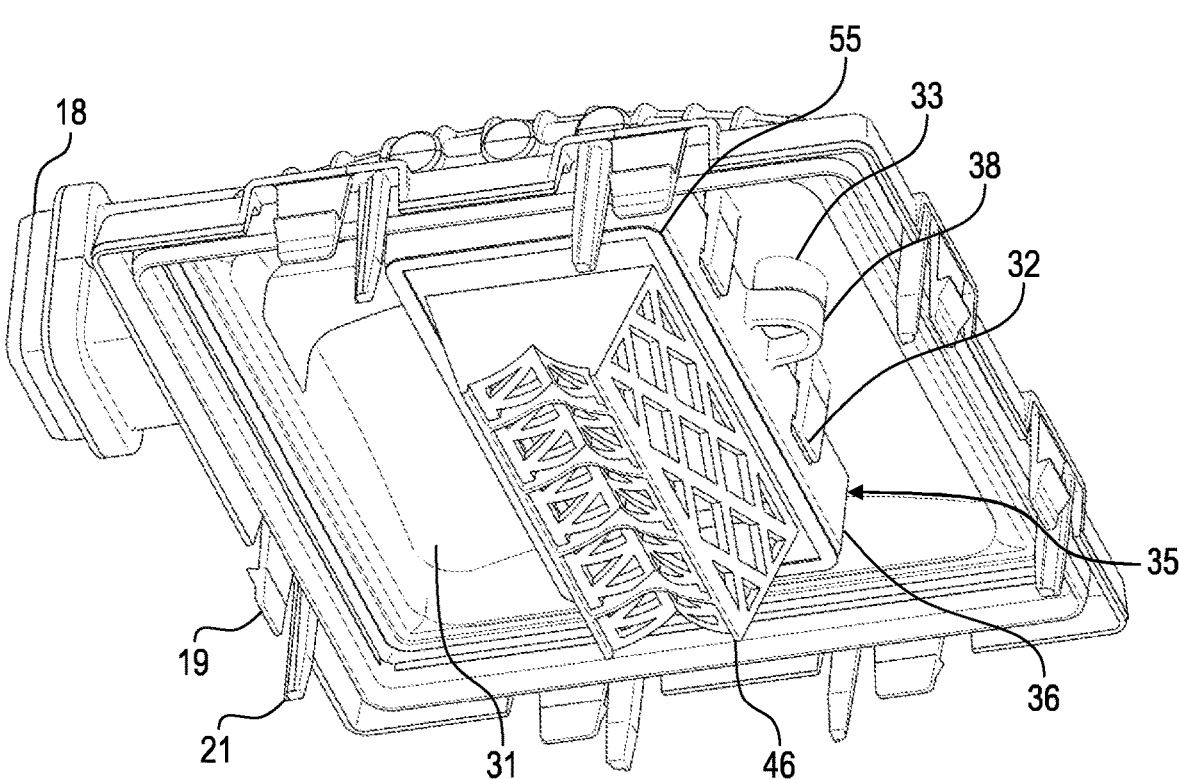
Figure 10:
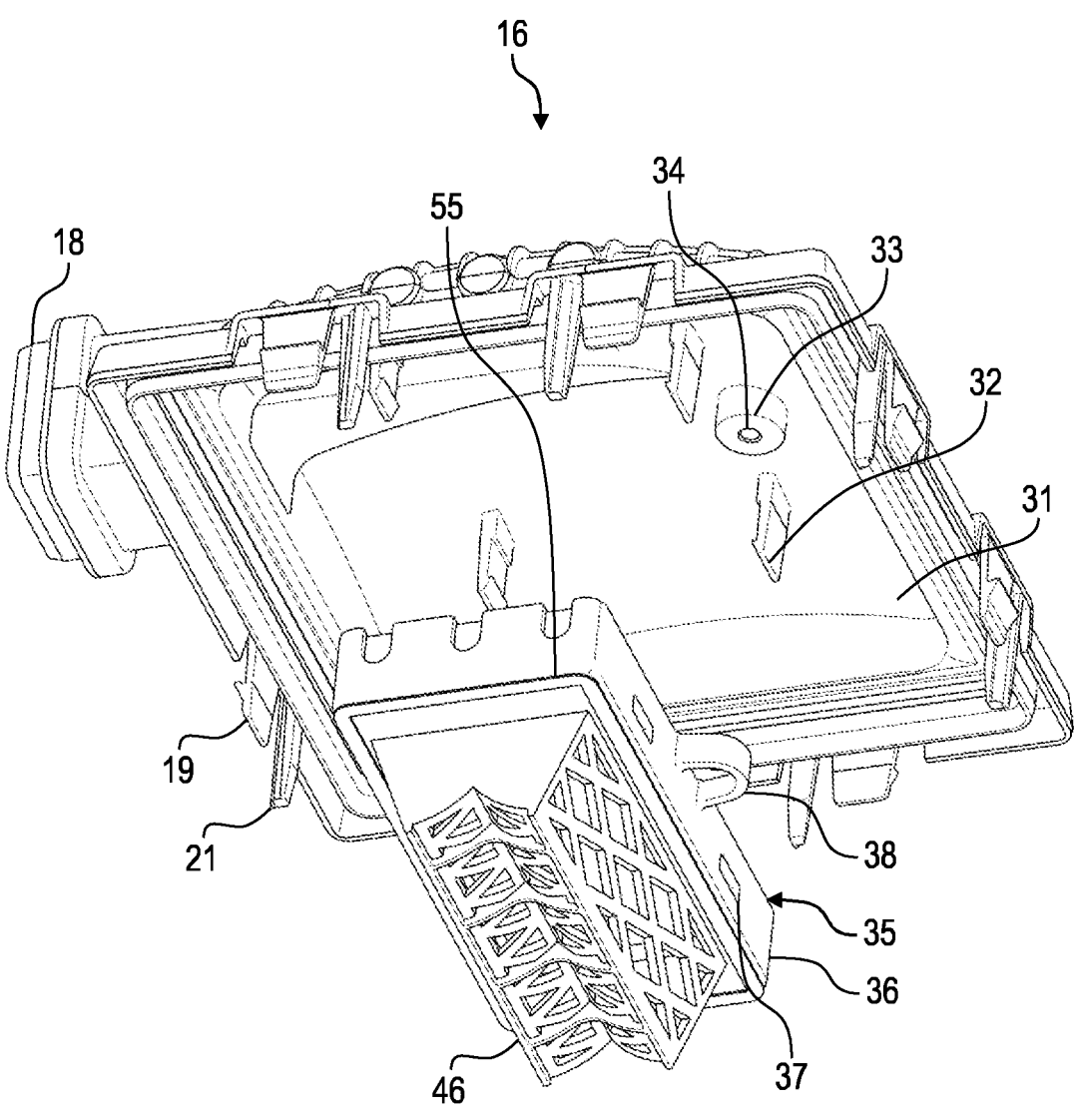
FIG. 10 is a schematic exploded perspective view of the second housing part according to FIG. 9.

FIG. 9 shows a perspective view of one embodiment of the second housing part 16. FIG. 10 shows an exploded perspective view of the second housing part 16. In the following, FIGS. 9 and 10 will be referred to at the same time.

The second housing part 16 has an inner surface 31 that faces the interior 30. From the inner surface 31, a plurality of snap hooks 32, of which only one is provided with a reference sign, protrude into the interior 30. Also a cylindric attachment section 33 protrudes from the inner surface 31 into the interior 30. The attachment section 33 has a central bore 34. The bore 34 can have a thread.

An air heating and guidance mechanism 35 is attached to the second housing part 16. The air heating and guidance mechanism 35 lies against the inner surface 31. The air heating and guidance mechanism 35 is attached to the second housing part 16 by means of the snap hooks 32 and the attachment section 33.

Figure 11:
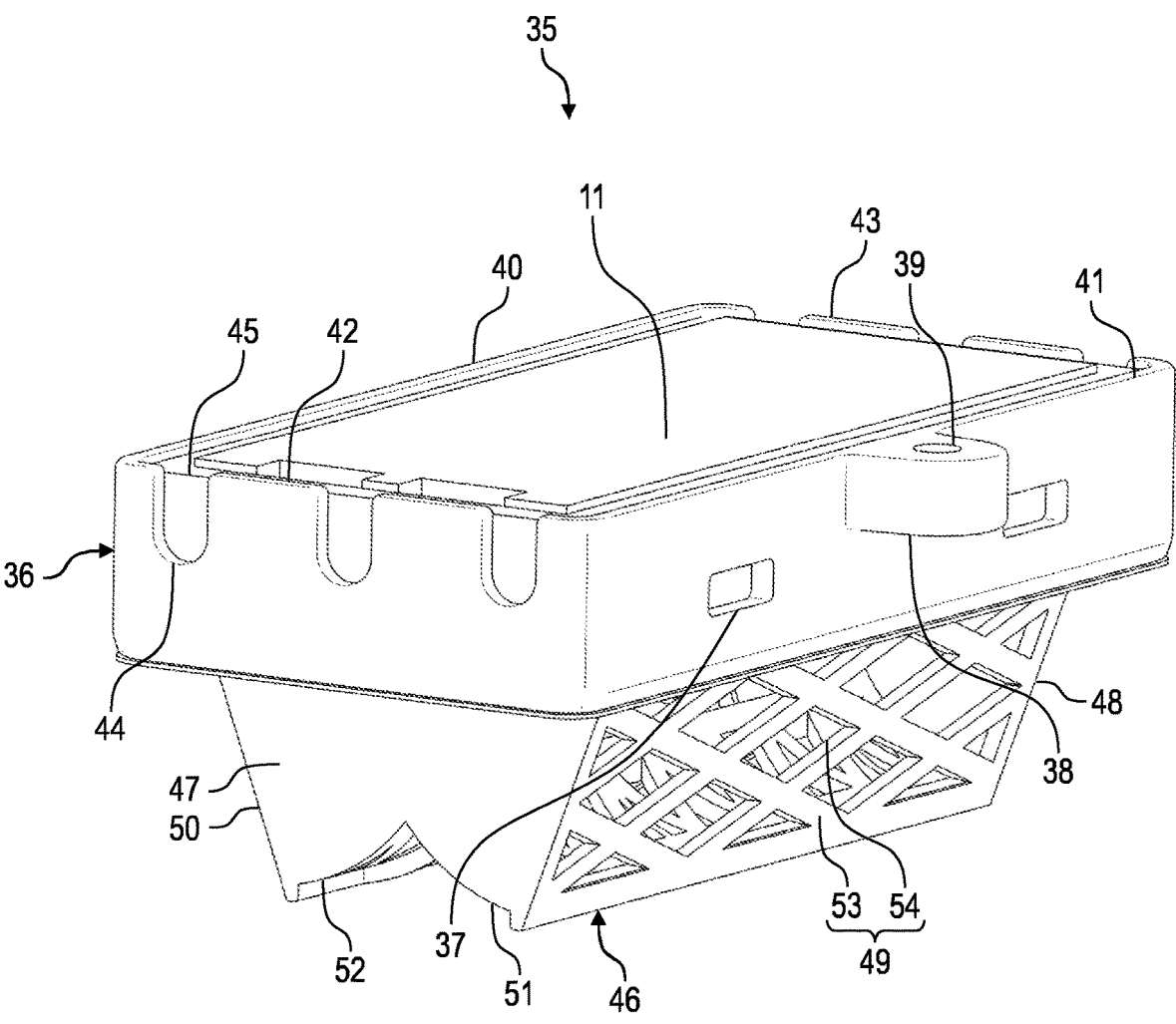
FIG. 11 is a schematic perspective view of one embodiment of an air heating and guidance mechanism for the sorption filter device according to FIG. 3.

A perspective view of the air heating and guidance mechanism 35 is shown in FIG. 11. The air heating and guidance mechanism 35 includes a frame 36. The frame 36 has engagement openings 37 that engage with the snap hooks 32 to attach the air heating and guidance mechanism 35 to the second housing part 16. The frame 36 has an attachment section 38. The attachment section 38 has a bore 39. The attachment section 38 of the frame 36 can be bolted to the attachment section 33 of the second housing part 16.

The frame 36 is rectangular and includes two opposing side walls 40, 41 and two opposing face walls 42, 43. The engagement openings 37 are provided at the side walls 40, 41. The attachment section 38 is provided at the side wall 41. The face walls 42, 43 have openings 44 of which only one is provided with a reference sign.

The frame 36 receives a first heating element 11 as mentioned before. However, in this case, the first heating element 11 is not a heating wire but a plate-shaped heating element. In particular, the first heating element 11 is a positive temperature coefficient (PTC) heater. The first heating element 11 is glued into the frame 36 by means of an adhesive 45. The adhesive 45 is temperature resistant.

The air heating and guidance mechanism 35 further includes an air guidance element 46. The air guidance element 46 and the frame 36 can be formed integrally. The air guidance element 46 includes two opposing face walls 47, 48. Furthermore, the air guidance element 46 includes two opposing first side walls 49, 50 and two opposing second side walls 51, 52. The first side walls 49, 50 are inclined to each other. The second side walls 51, 52 are also inclined to each other. The side walls 49 to 52 form a W-shaped cross section of the air guidance element 46. The side walls 49 to 52 are truss-shaped and include a plurality of struts 53 and openings 54 that are separated from each other by means of the struts 53.

A flexible sealing element 55 (FIGS. 9 and 10) runs around the air guidance element 46. The sealing element 55 is rectangular.

Figure 12:
FIG. 12 is a schematic perspective view of one embodiment of a sorption filter element for the sorption filter device according to FIG. 3.
Figure 12:
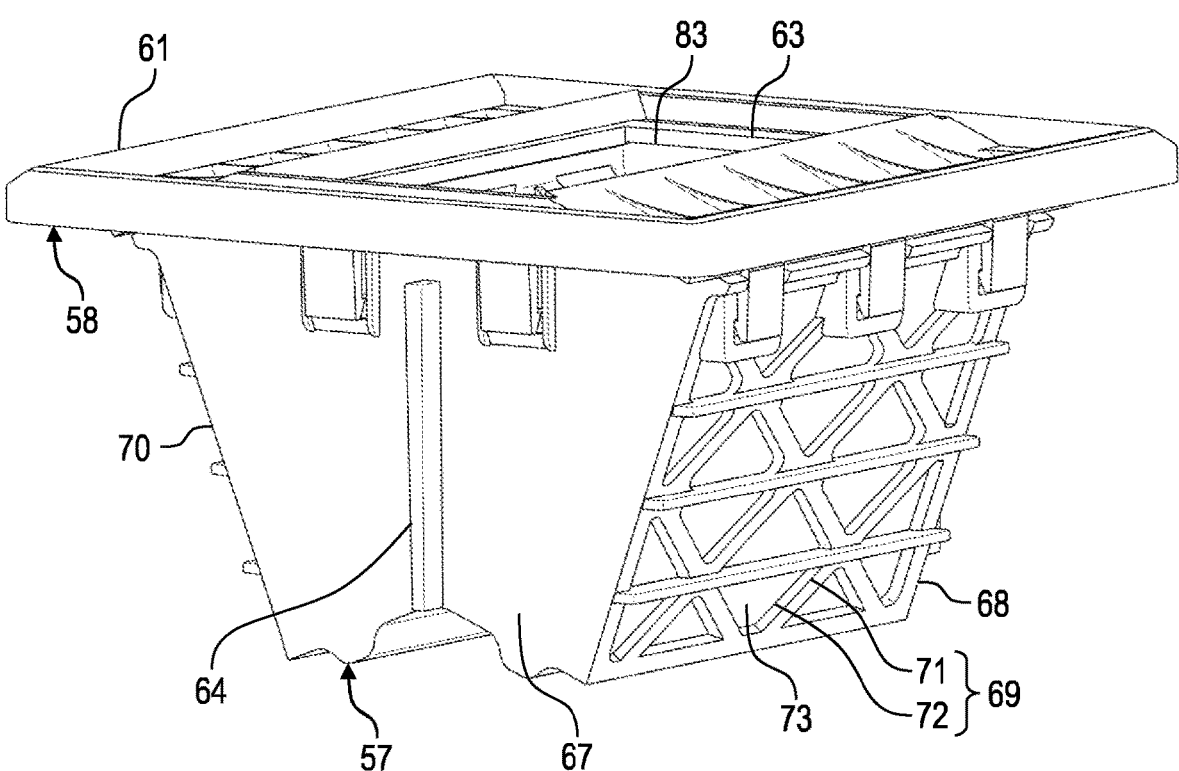
Figure 13:
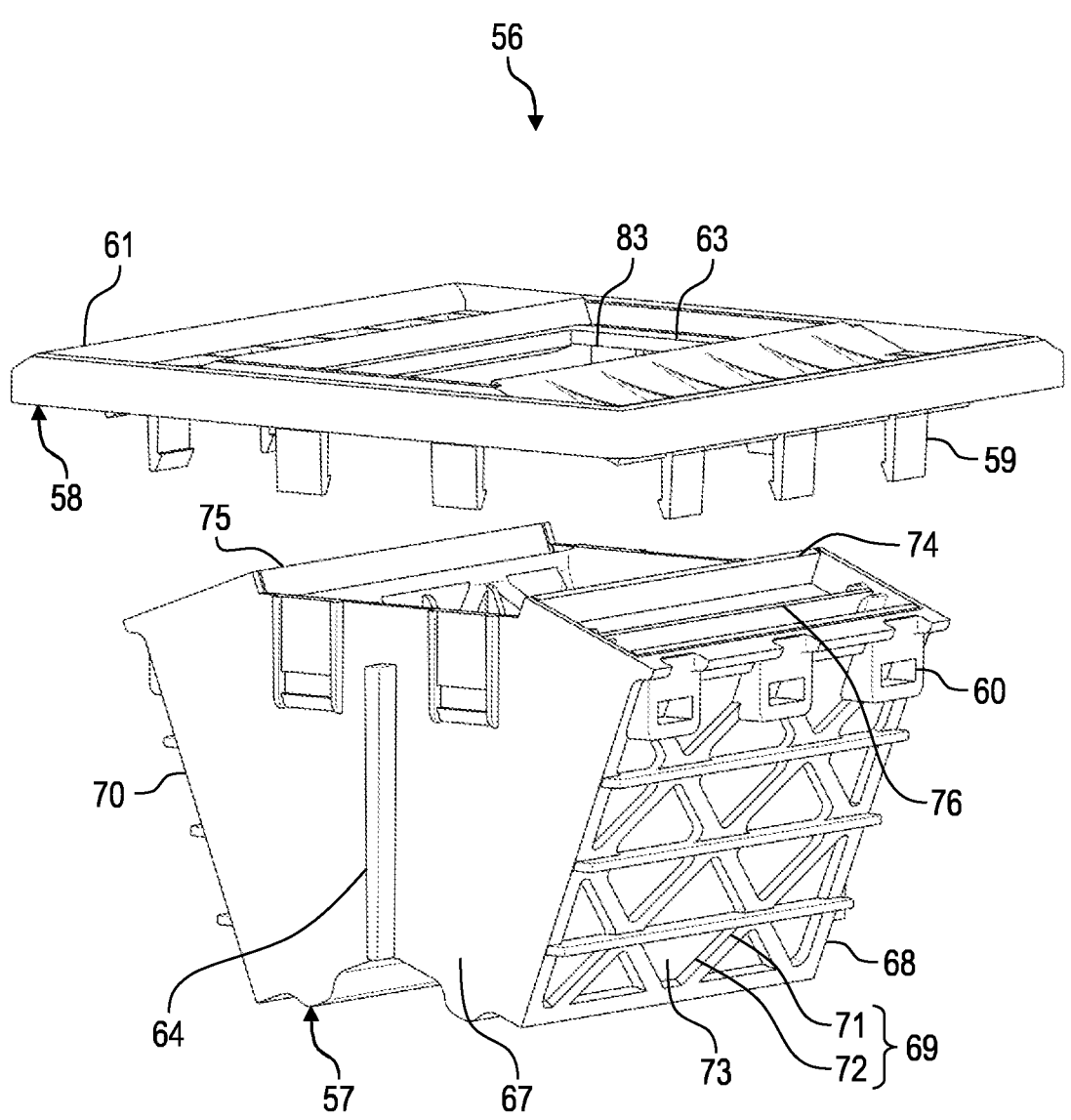
FIG. 13 is a schematic exploded perspective view of the sorption filter element according to FIG. 12.

Now returning to FIGS. 3 to 8, the first sorption filter device 6 has a sorption filter element 56. The sorption filter element 56 is exchangeable. The sorption filter element 56 includes the sorbents 8, 9. A schematic perspective view of the sorption filter element 56 is shown in FIG. 12. FIG. 13 shows a schematic exploded view of the sorption filter element 56.

The directions x, y, z can be assigned to the sorption filter element 56. The sorption filter element 56 includes a body 57 and a cover 58. The cover 58 includes a plurality of snap hooks 59 of which only one is provided with a reference sign. The snap hooks 59 engage with receiving sections 60 of the body 57. Only one of the receiving sections 60 is provided with a reference sign. The cover 58 includes a sealing element 61 that lies against a sealing surface 62 (FIG. 6) of the second housing part 16. The sealing element 61 is flexible. The cover 58 has a sealing surface 63. The sealing element 55 lies against the sealing surface 63.

The sealing element 61 and the sealing surface 62 form a first sealing plane E1 (FIG. 6). The sealing element 55 and the sealing surface 63 form a second sealing plane E2. When seen along the height direction y, the sealing planes E1, E2 are spaced apart from each other in a distance d. The sealing planes E1, E2 together form a sealing interface F of the sorption filter element 56.

The body 57 includes guidance tracks 64 to 66 (FIG. 8) that engage with the guidance tracks 22 to 24 of the first housing part 15. The body 57 has two face walls 67, 68. The guidance track 64 protrudes from the face wall 67. The guidance tracks 65, 66 protrude from the face wall 68. Two outer side walls 69, 70 are inclined to each other. The outer side walls 69, 70 are truss-shaped. The outer side walls 69, 70 includes struts 71 and openings 72. The openings 72 are separated from each other by means of the struts 71. The openings 72 are covered by means of a fluid permeable material 73. The material 73 can be a fiber material, for example a fleece material.

The body 57 further has inner side walls 74, 75. The inner side walls 74, 75 are inclined to each other. The side walls 69, 74 are parallel to each other. The side walls 70, 75 are parallel to each other. The inner side walls 74, 75 are, as the outer side walls 69, 70, fluid permeable. This means that also the inner side walls 74, 75 are truss-shaped and include struts 71 and openings 72 as mentioned before. The inner side walls 74, 75 are covered with the material 73 too. The sorbents 8, 9 are placed between the side walls 69, 74 and the side walls 70, 75. The sorbents 8, 9 are part of a first sorption body B1 and a second sorption body B2. The material 73 is part of the sorption bodies B1, B2.

The sorbents 8, 9 can be mixed as shown in FIG. 2 or, as shown in FIG. 8, be separated from each other by means of a separating material 76, 77. There are provided guidance tracks 78 to 81 for receiving the separating material 76, 77. The separating material 76, 77 is fluid permeable. The inner side walls 74, 75 enclose an intermediate space 82 (FIG. 6) that receives the air guidance element 46. The cover 58 includes an opening 83 (FIGS. 12 and 13). The air guidance element 46 is guided through that opening 83 into the intermediate space 82. The side walls 49, 50 of the air guidance element 46 enclose an inner space 84 (FIG. 6) that is separated from the intermediate space 82.

In the sorption mode M1, raw air RO loaded with $CO_2$ and $H_2O$ from the passenger compartment 3 is fed to the first sorption filter device 6 by means of the first air inlet/outlet 17. The raw air RO is passed through the first sorption filter device 6. The purified raw air RO is fed back to the passenger compartment 3 as clean air RL via the second air inlet/outlet 18.

In the desorption mode M2, unloaded regeneration air R1 is supplied to the first sorption filter device 6 via the second air inlet/outlet 18. The unloaded regeneration air R1 passes the air heating and guidance mechanism 35 which applies heat Q to the unloaded regeneration air R1. The unloaded regeneration air R1 passes the sorption filter element 56 and leaves the first sorption filter device 6 via the first air inlet/outlet 17 as loaded regeneration air R2.

The invention claimed is:

1. A sorption filter device comprising:
   a sorption filter element comprising:
   at least two sorption bodies with at least one sorbent, the at least two sorption bodies being arranged in a V-shape and enclosing an intermediate space that is open at a head side thereof;
   an outer sealing element running around an outer circumference of the head side; and
   an inner sealing surface arranged at the head side and running around a circumference delimiting the intermediate space at the head side;
   a housing comprising:
   a first housing part configured to receive the sorption filter element;
   a second housing part detachably connectable to the first housing part and configured to close the housing in a closed state thereof, the sorption filter element being received in the first housing part in such a way that the head side of the sorption filter element faces the second housing part;
   at least one first air inlet/outlet; and
   at least one second air inlet/outlet, the sorption filter element being arranged between the at least one first air inlet/outlet and the at least one second air inlet/outlet in a fluidic way, and at least one of the at least one first air inlet/outlet and the at least one second air inlet/outlet being arranged at the second housing part; and
   an air guidance element arranged between the sorption filter element and the second housing part, and configured to protrude into the intermediate space at the head side in a mounted state of the second housing part.

2. The sorption filter device according to claim 1, wherein the inner sealing surface of the sorption filter element is arranged within an inner space of the sorption filter element.

3. The sorption filter device according to claim 1, wherein the air guidance element comprises an outer contour corresponding to a contour of the intermediate space.

4. The sorption filter device according to claim 1, wherein the air guidance element comprises air guidance side walls having a that are grid-like arrangement of struts and openings, the openings separated from each other by the struts.

5. The sorption filter device according to claim 1, wherein the air guidance element is connected to the sorption filter element.

6. The sorption filter device according to claim 1, further comprising an air heating and guidance mechanism comprising:
   the air guidance element; and
   an axial sealing element configured to lie against the inner sealing surface of the sorption filter element in the mounted state of the second housing part.

7. The sorption filter device according to claim 6, wherein the housing further comprises a circumferential outer sealing surface against which the outer sealing element of the sorption filter element lies in the mounted state of the second housing part.

8. The sorption filter device according to claim 7, wherein the circumferential outer sealing surface of the housing is axially set back relative to the axial sealing element of the air heating and guidance mechanism.

9. The sorption filter device according to claim 6, wherein the air heating and guidance mechanism further comprises a heating element arranged within the second housing part and arranged axially beyond the intermediate space.

10. The sorption filter device according to claim 1, wherein the housing further comprises a circumferential outer sealing surface against which the outer sealing element of the sorption filter element lies in the mounted state of the second housing part.

11. The sorption filter device according to claim 10, wherein the circumferential outer sealing surface of the housing is arranged at the first housing part or at the second housing part.

12. The sorption filter device according to claim 1, wherein the inner sealing surface is axially set back relative to the outer sealing element.

* * * * *